United States Patent
Harada et al.

[11] Patent Number: 6,103,425
[45] Date of Patent: Aug. 15, 2000

[54] LIQUID-ABSORBING RESIN, MANUFACTURING METHOD THEREOF AND GEL COMPOSITION

[75] Inventors: Nobuyuki Harada, Suita; Koji Miyake, Himeji, both of Japan

[73] Assignee: Nippon Shokubai Co., Ltd., Osaka, Japan

[21] Appl. No.: 09/011,997

[22] PCT Filed: Jun. 19, 1997

[86] PCT No.: PCT/JP97/02104

§ 371 Date: Feb. 23, 1998

§ 102(e) Date: Feb. 23, 1998

[87] PCT Pub. No.: WO97/48487

PCT Pub. Date: Dec. 24, 1997

[30] Foreign Application Priority Data

| Jun. 21, 1996 | [JP] | Japan | 8-162085 |
| Aug. 8, 1996 | [JP] | Japan | 8-210292 |
| Aug. 8, 1996 | [JP] | Japan | 8-210293 |

[51] Int. Cl.[7] .................................................. H01M 6/22
[52] U.S. Cl. ......................... 429/303; 429/314; 252/62.2
[58] Field of Search ................................... 429/303, 314; 252/62.2

[56] References Cited

U.S. PATENT DOCUMENTS

| 4,451,582 | 5/1984 | Denzinger et al. | |
| 4,931,282 | 6/1990 | Asmus et al. | 424/448 |
| 5,073,614 | 12/1991 | Shih et al. | 526/258 |
| 5,240,791 | 8/1993 | Izuti et al. | 429/192 |
| 5,300,606 | 4/1994 | Aizawa et al. | 526/307.6 |
| 5,407,996 | 4/1995 | Aizawa et al. | 524/555 |
| 5,639,573 | 6/1997 | Oliver et al. | 429/303 |

FOREIGN PATENT DOCUMENTS

| 0 088 964 | 9/1983 | European Pat. Off. |
| 1-166764 | 6/1989 | Japan |
| 3-176065 | 7/1991 | Japan |
| 8-059743 | 3/1996 | Japan |
| 8-32755 | 3/1996 | Japan |
| 2 010 864 | 7/1978 | United Kingdom |

*Primary Examiner*—Stephen Kalafut
*Attorney, Agent, or Firm*—Nixon & Vanderhye P.C.

[57] ABSTRACT

A liquid-absorbing resin is obtained by polymerizing a monomer component containing a cyclic N-vinyllactam. The liquid-absorbing resin possesses superb liquid absorbency for organic solvents, especially organic solvents containing an electrolyte, and can be suitably used as a high polymer solid electrolyte in an electric cell by retaining therein an organic solvent containing an electrolyte. Used as the organic solvent is, specifically, a water-compatible organic solvent of a solubility parameter of not less than 9 $(cal/cm^3)^{1/2}$.

10 Claims, 1 Drawing Sheet

FIG.1

LIQUID-ABSORBING RESIN, MANUFACTURING METHOD THEREOF AND GEL COMPOSITION

FIELD OF THE INVENTION

The present invention relates to liquid-absorbing resins possessing superb liquid absorbency and retainment for various liquids primarily containing electrolyte, and further relates to manufacturing methods of such liquid-absorbing resins and gel compositions containing such liquid-absorbing resins.

BACKGROUND OF THE INVENTION

In recent years, efforts have been made in various fields to utilize water-swelling polymers having a structure of crosslinked water-soluble polymer by taking advantage of the liquid absorbency and retainment thereof. The water-swelling polymers are studied for exploitation as hygienic goods such as disposable diapers, sanitary goods, contact lenses, cosmetics, paints, adhesive agents, water-stopping agents, soil-improving agents, etc. and also in the medical field for control of releasing of pharmaceuticals.

The water-swelling polymers, that are crosslinked polymers, are manufactured with various methods. A well-known, frequently used, industrial method is to, upon addition polymerization of a monomer of a vinyl compound, or vinyl compounds, by a radical polymerization or other method, introduce crosslinking points into the polymer chain by copolymerizing the vinyl compound(s) with a compound (i.e. a crosslinking agent) containing a plurality of functional groups, such as vinyl groups, that are copolymerizable with the vinyl compound(s).

Well-known examples of the water-swelling polymers obtained by the above process include polyacrylic acid liquid-absorbing resins and polyvinylacetamide liquid-absorbing resins (see Japanese Laid-Open Patent Applications No. 4-230250/1992 (Tokukaihei 4-230250) and No. 8-59743/1996 (Tokukaihei 8-59743).

However, the above-mentioned conventional liquid-absorbing resins hardly offer satisfactory liquid absorbency, especially, for electrolyte solutions containing a large proportion of salt and other substances, and therefore are limited in application when used in a field where an electrolyte solution containing various water-soluble substances needs to be absorbed and retained in a controlled manner. In addition, the polyacrylic acid liquid-absorbing resins dissolve and release a relatively large amount of soluble components when in contact with an aqueous liquid, causing safety and resistance problems.

Meanwhile, efforts have been made in various fields also to utilize liquid-absorbing resins having absorbed an organic solvent containing an electrolyte as an electrolyte solution by taking advantage of the liquid absorbency and retainment. A prospective field for such liquid-absorbing resins is thin, large capacity electric cells incorporated in mobile phones and notebook type personal computers which have seen large increases in the number of users in recent years. However, the electric cell employing an electrolyte solution is difficult to fabricate in a thin shape, because it needs to be completely sealed with, for example, a metal canister to prevent leakage of the electrolyte solution, but the metal container is difficult to fabricate in such a thin shape. Researches are being conducted to utilize a gel composition as a high polymer solid electrolyte in lieu of an electrolyte solution, the gel composition resulting from absorption of an organic solvent containing an electrolyte by a liquid-absorbing resin.

Examples of a high polymer solid electrolyte employed in such an electric cell include a high polymer solid electrolyte containing an organic solvent (electrolyte-containing organic solvent) produced by dissolving an electrolyte in a crosslinked polymer obtained by reacting an acryroyl compound having an urethane bond (see Japanese Laid-Open Patent Application No. 3-84807/1991 (Tokukaihei 3-84807), and a high polymer solid electrolyte composed by a crosslinked polymer containing an electrolyte, the crosslinked polymer being produced by reacting the mixture of a diacrylic acid ester and/or dimethacrylic acid ester of polypropylene glycol and a monoacrylic acid ester and/or monomethacrylic ester of a polyether (see Japanese Publication for Examined Application No. 8-32755/1996 (Tokukohei 8-32755).

None of the high polymer solid electrolytes disclosed by the laid-open patent applications above can retain a satisfactory amount of an organic solution having dissolved, or being capable of dissolving, an electrolyte (e.g., the ratio of the amount of a propylene carbonate retained by a crosslinked polymer to that of the crosslinked polymer is from 1:1 to less than 2:1). Those organic solvents should be absorbed and retained in larger quantities to improve properties of the electric cell.

DISCLOSURE OF THE INVENTION

In view of the conventional problems mentioned above, objects of the present invention are to offer liquid-absorbing resins possessing superb liquid absorbency and retainment for various liquids primarily containing electrolyte, manufacturing methods of such liquid-absorbing resins, and gel compositions containing such liquid-absorbing resins.

The inventors of the present invention have diligently worked in order to accomplish the objects. As a result, the inventors have found that a liquid-absorbing resin produced by polymerization of a monomer component containing a cyclic N-vinyllactam exhibits excellent absorbency and retainment for an organic solvent, especially an organic solvent containing an electrolyte and that a gel composition containing such a liquid-absorbing resin retaining an organic solvent can be suitably applied for various purposes including electric cells, which has led to the completion of the invention.

In order to accomplish the object, a gel composition in accordance with the present invention is characterized in that it contains an organic solvent and a liquid-absorbing resin produced by polymerization of a monomer component containing a cyclic N-vinyllactam, wherein the liquid-absorbing resin retains the organic solvent therein.

In order to accomplish the object, a gel composition in accordance with the present invention is characterized in that it contains an organic solvent containing an electrolyte and a liquid-absorbing resin produced by polymerization of a monomer component containing a cyclic N-vinyllactam, wherein the liquid-absorbing resin retains the organic solvent containing an electrolyte therein.

In order to accomplish the object, a gel composition in accordance with the present invention is characterized in that it contains an N-vinyl-2-pyrolidone crosslinked polymer and a propylene carbonate containing a salt of lithium ions, wherein the N-vinyl-2-pyrolidone crosslinked polymer retains the propylene carbonate containing a salt of lithium ions therein.

It is possible with such an arrangement to offer a gel composition possessing superb absorbency and retainment for an organic solvent such as an electrolyte-containing organic solvent. Therefore, the electric cells employing the gel composition as the high polymer solid electrolyte retains a large amount of an organic solvent such as an electrolyte-containing organic solvent and enables prevention of leakage of the organic solvent.

Also, as a result of the diligent work to accomplish the objects, the inventors have found that a liquid-absorbing resin can be formed with higher liquid absorbency and a smaller amount of soluble components than the conventional counterparts, by subjecting a monomer component containing a cyclic N-vinyllactam and a crosslinking monomer containing an allyl-group-containing compound to solution gel polymerization, which has led to the completion of the invention.

In order to accomplish the object, a manufacturing method of a liquid-absorbing resin in accordance with the present invention is characterized in that it includes the step of copolymerizing a cyclic N-vinyllactam and a crosslinking monomer containing an allyl-group-containing compound in a solution, wherein in that step the intermediate product for the liquid-absorbing resin is crosslinked while retaining the solution therein.

In order to accomplish the object, a manufacturing method of a liquid-absorbing resin in accordance with the present invention is characterized in that a gel liquid-absorbing resin is prepared by copolymerizing a monomer component containing a cyclic N-vinyllactam and a crosslinking monomer containing an allyl-group-containing compound in a solution compatible with the resultant liquid-absorbing resin.

It is possible with such an arrangement to stably obtain a liquid-absorbing resin with a smaller amount of soluble components and excellent liquid absorbency, e specially, for a highly concentrated electrolyte solution.

The liquid-absorbing resin obtained by such a manufacturing method measures 90 or over in the sum of the liquid absorption ratios thereof for a 20-weight-% water solution of sodium chloride, a 20-weight-% water solution of calcium chloride, and a 20-weight-% water solution of magnesium chloride, and contains no more than 20 weight % soluble component.

The liquid-absorbing resin possesses satisfactory liquid absorbency for an electrolyte solution containing a large proportion of salt and other substances, and therefore can absorb and stably retain an electrolyte solution containing various water-soluble substances, being suitably applied in various fields where various electrolyte solutions need to be retained in a controlled manner. In addition, the liquid-absorbing resin contains no more than 20 weight % soluble component, exhibits excellent resistance, and can be suitably applied in fields where safety is a primary concern.

The present invention will be discussed in more detail in the following.

The liquid-absorbing resin in accordance with the present invention is a crosslinked polymer prepared by polymerizing a monomer component containing a cyclic N-vinyllactam.

Examples of the cyclic N-vinyllactam used as a material for the crosslinked polymer in the present invention include N-vinylpyrolidone, N-vinylcaprolactam, and N-vinylimidazoline. Any one of the cyclic N-vinyllactams may be used alone, or alternatively, a plurality of them can be used in combination. N-vinylpyrolidone and/or N-vinylcaprolactam are preferred among those cyclic N-vinyllactams. From the point of view of safety of the monomer and the resultant liquid-absorbing resin, N-vinyl-2-pyrolidone is especially preferred. N-vinyl-2-pyrolidone is more preferred.

The monomer components may, if necessary, contain an additional monomer other than the cyclic N-vinyllactams, more specifically, contain a monomer copolymerizable with the cyclic N-vinyllactams, in a range that does not alter the desired properties of the gel compositions. That additional monomer is not limited in any particular manner, specifically being (meth)accylic acid, maleic acid, vinylsulfonic acid, 2-(meth)acrylamide-2-methylpropanesulfonic acid, sulfoalkyl(meth)acrylate, alkali metal salts thereof, and ammonium salts thereof; dimethylaminoethyl(meth)acrylate and a quaternary compound thereof and; (meth)acrylamide, methoxypolyethyleneglycol(meth)acrylate, hydroxyalkyl(meth)acrylate, and N-isopropyl(meth)acrylamide, as examples.

Any one of the additional monomers may be used alone, or alternatively, a plurality of them can be used in combination. Especially preferred among the additional monomers is at least one monomer selected from the group consisting of (meth)accylic acid, 2-(meth)acrylamide-2-methylpropanesulfonic acid, sulfoalkyl(meth)acrylate, alkali metal salts thereof, and ammonium salts thereof; dimethylaminoethyl(meth)acrylate and a quaternary compound thereof; (meth)acrylamide, and methoxypolyethyleneglycol(meth)acrylate. The monomer composition, by including the additional monomer, enhances softness of the gel component obtained from retaining an organic solvent in the crosslinked polymer.

The ratio of the cyclic N-vinyllactam in the monomer component is preferably not less than 40 mole %, especially preferably not less than 60 mole %, more preferably not less than 80 mole %, and most preferably 100 mole %. If the ratio of the cyclic N-vinyllactam in the monomer component is less than 40 mole %, the liquid-absorbing resin exhibits poor salt resistance, in other words, does not offer satisfactory liquid absorbency for solutions containing a high concentration of salt. When retaining a water solution containing an organic solvent such as ethanol or propylene carbonate (4-methyl-1,3-dioxolan-2-one) and/or a highly concentrated inorganic salt, the ratio of the cyclic N-vinyllactam in the monomer component is preferably not less than 80 mole %, and especially preferably 100 mole %.

When the crosslinked polymer is used for absorbing an organic solvent, for example, in an electric cell, the ratio of the cyclic N-vinyllactam in the monomer component is preferably not less than 50 mole especially preferably not less than 70 mole %, more preferably not less than 90 mole %, and most preferably 100 mole %. If the ratio of the cyclic N-vinyllactam in the monomer component is less than 50 mole %, the liquid-absorbing resin does not offer satisfactory liquid absorbency for an organic solvent, especially, an organic solvent, of a high concentration of salt, solving a large amount of electrolyte. That is, in order to improve the liquid absorbency for an electrolyte-containing organic solvent, that is an organic solvent solving electrolyte, the ratio of the cyclic N-vinyllactam in the monomer component should be as close to 100 mole % as possible. When the gel component is to be used in an electric cell, the liquid absorption ratio of an electrolyte-containing organic solvent absorbed by the crosslinked polymer of the gel component to that crosslinked polymer is preferably more than 2:1, and for this purpose, more than 50 mole % of the cyclic N-vinyllactam is required.

In the present invention, a crosslinking agent is used, if necessary, to prepare the crosslinked polymer. That crosslinking agent is not limited in any particular manner, as long as it is a compound having more than two polymerizable ethylenic unsaturated double bonds in a molecule.

Examples of the crosslinking agent include N,N'-methylene bisacrylamide, ethylene glycol di(meth)acrylate, polyethylene glycol di(meth)acrylate, trimethylol propane tri(meth)acrylate, N,N'-divinyl-2-imidazolizinone, N,N'-1,4-butylene bis(N-vinyl acetamide), allyl(meth)acrylate, diallyl amine, triallylamine, tetraallyloxyethane, triallylcyanurate, triallylisocyanurate, (poly)ethylene glycol diallylether, diallylether, trimethylolpropanetriallylether, allyl sulfide, allyl disulfide, diallyl urea, trimellitic acid triallyl, diallyl dimethylammonium chloride, diallylesters of polybasic acid such as diallyl sodium oxalate, phthalic acid diallyl, and succinic acid diallyl.

Besides, when the monomer component contains a monomer having an acid group such as a carboxylic group or sulfonic group, a compound having in a molecule more than two functional groups that can react with an acid group may be used as the crosslinking agent. Examples of such a compound include (poly)ethylene glycol disglycidylether, ethylenediamine, polyethylene imine, (poly)ethylene glycol, glycerine, and allylglycidylether.

Any one of the crosslinking agents may be used alone, or alternatively, a plurality of them can be used in combination. However, the crosslinking agent, by containing an allyl-group-containing compound, can improve efficiency in the crosslinking, reducing the amount of crosslinking agent used and permitting the manufacture of desired crosslinked polymers at a low cost.

The allyl-group-containing compound is not limited in any particular manner, as long as it is a crosslinking monomer containing an allyl group. Examples of crosslinking monomers containing one allyl group in each molecule include allylmethacrylate and allylglycidylether. The latter example, i.e. allylglycidylether, can be used for copolymerizing a monomer containing an acid group such as acrylic acid.

Examples of crosslinking monomers containing more than one allyl group in each molecule include diallylamine, triallylamine, tetraallyloxyethane, triallylcyanurate, triallylisocyanurate, (poly)ethyleneglycol dial lylether, diallylether, trimethylolpropane triallylether, allyl sulfide, allyl disulfide, diallyl urea, trimellitic acid triallyl, diallyl dimethylammonium chloride, diallylesters of polybasic acid such as diallyl sodium oxalate, phthalic acid diallyl, and succinic acid diallyl.

Preferred among those allyl-group-containing compounds are crosslinking monomers containing more than one allyl group in each molecule. Preferred among those allyl-group-containing compounds is at least one compound selected from the group consisting of diallylamine, triallylamine, tetraallyloxyethane, triallylcyanurate, triallylisocyanurate, (poly)ethyleneglycol diallylether, diallylether, and trimethylolpropane triallylether, since they are reactive, readily available, and highly effective for crosslinking even in small amounts.

Typically, the amount of the crosslinking agent used to the monomer component, i.e. the amount of the crosslinking agent added to the monomer component, although varying depending upon the polymerization conditions, the composition of the monomer component, etc., is preferably in a range of 0.001 mole % to 5 mole %, and more preferably, in a range of 0.01 mole % to 2 mole %. If the amount of the crosslinking agent used is less than 0.001 mole %, it is likely that only a water-soluble resin is obtained with no crosslinked polymer. Meanwhile, if the amount of the crosslinking agent used is more than 5 mole %, it is likely that an insoluble resin is obtained with poor liquid absorbency due to disruption in swelling by absorption of water. Note that if the monomer component contains more than 90 mole % cyclic N-vinyllactam, the amount of the crosslinking agent used is preferably in a range of 0.01 mole % to 2 mole %.

The manufacturing method of crosslinked polymers, i.e. the polymerization method of the monomer component, is not limited in any particular manner. Various methods may be adopted: namely, a solution polymerization method such as a solution gel polymerization method or a precipitation polymerization method; a suspension polymerization method; and an emulsion polymerization method, as examples. Preferred among those methods is a solution gel polymerization method.

For example, the monomer component may be polymerized, specifically, by directly suspending or emulsifying a monomer component solving a crosslinking agent in a hydrophobic organic solvent.

If a solution polymerization method is employed as the aforementioned polymerization method, the monomer component may be polymerized (i) by stationary placing in a container such as a belt, vat or beaker; (ii) by agitating in a two-armed kneader as necessary; or (iii) letting polymerize on a base material such as nonwoven fabric or film after a solution containing the monomer component and the crosslinking agent is painted on the base material. If method (iii) is adopted, a complex of a polymer and a base material being integrated is obtained.

More specifically, employed as examples of methods (i) to (iii) are: ① a method of polymerizing a solution containing the monomer component and the crosslinking agent in the presence of a crosslinking initiator statically or with agitation; ② a method of polymerizing by irradiation of a solution at least containing the monomer component with an electron beam, γ beam, etc.; ③ a method of directly polymerizing a solution containing at least the monomer component after painting the solution on a base material such as nonwoven fabric or a perforated film; ④ a method of crosslinking by irradiating a solution containing a linear polymer obtained by polymerization of the monomer component with an electron beam, γ beam, etc.; ⑤ a method of directly polymerizing a solution containing a linear polymer obtained by polymerization of the monomer component after painting the solution on a base material such as nonwoven fabric or a perforated film.

If a solution polymerization method is employed, especially if a precipitation polymerization method is employed as the solution polymerization method, the monomer component should be polymerized, or copolymerized with an crosslinking agent, in a solution which dissolves monomer components but shows no compatibility with polymers.

The principal example of the solution used when a precipitation polymerization method is employed as the solution polymerization method is a hydrophobic organic solvent with a solubility parameter less than 9 $(cal/cm^3)^{1/2}$, such as cyclohexane (solubility parameter; 8.2 $(cal/cm^3)^{1/2}$) and hexane (solubility parameter; 7.3 $(cal/cm^3)^{1/2}$). In other words, if a hydrophobic organic solvent with a solubility parameter less than 9 $(cal/cm^3)^{1/2}$ is used as the aforementioned solution, a crosslinked polymer and an intermediate product therefor separate from the solvent during the polymerization reaction and precipitate. Besides, even if the solubility parameter is more than 9 $(cal/cm^3)^{1/2}$, by using a hydrophobic organic solvent, especially benzene (solubility parameter; 9.2 $(cal/cm^3)^{1/2}$), a crosslinked polymer and an intermediate product therefor separate from the solvent during the polymerization reaction and precipitate.

If a solution gel polymerization method is employed as the aforementioned solution polymerization method, the monomer component should be copolymerized with the crosslinking agent in a solution which shows compatibility with the obtained crosslinked polymer.

In the present invention, solution gel polymerization refers to polymerization by which a gel product of the obtained crosslinked polymer and solution being integrated after polymerization is prepared by subjecting the monomer component and the crosslinking agent to solution polymerization with substantially uniform solution. According to the solution gel polymerization, unlike precipitation polymerization, the polymerization reaction proceeds with no precipitation of the crosslinked polymer and intermediate product therefor produced during the reaction, and therefore it is easy to control the polymerization. In addition, the crosslinked polymer and intermediate product therefor produced by the precipitation polymerization hardly absorbs the solvent used for the precipitation polymerization, and does not form gel, thereby retaining no liquid therein. By contrast, the intermediate product for the crosslinked polymer obtained by the solution gel polymerization swells with the solution and crosslinked while retaining the solution therein. Therefore, when the solution gel polymerization is used, the crosslinking agent is uniformly dispersed in the intermediate product for the crosslinked polymer, consequently enabling uniform crosslinking on the surface and inside the intermediate product for the crosslinked polymer.

Especially, if the monomer component containing the cyclic N-vinyllactam and the crosslinking agent containing the allyl-group-containing compound undergo solution gel polymerization, a small amount of the crosslinking agent can achieve high efficiency in the crosslinking, the polymerization is easily controlled, and uniform crosslinking is formed on the surface and inside the intermediate product for the crosslinked polymer. The gel crosslinked polymer (gel polymer) obtained by the above method is efficient in crosslinking, no sticky, and easy to break into pieces. Therefore, if the monomer component containing the cyclic N-vinyllactam and the crosslinking agent containing the allyl-group-containing compound undergo solution gel polymerization, it is possible to manufacture desired a liquid-absorbing resin at a low cost, and to obtain a liquid-absorbing resin with excellent liquid absorbency and little soluble component. Besides, the liquid-absorbing resin obtained by the above method is easy to handle.

In the present invention, the solution used in the above solution gel polymerization process should be compatible with the resultant crosslinked polymer. The solution is not limited in a particular manner, as long as it solves the monomer component and crosslinking agent and can produce uniform gel with the resultant crosslinked polymer after polymerization. Examples of such a solution include water, a water-compatible organic solvent with a solution parameter of not less than 9 $(cal/cm^3)^{1/2}$, preferably not less than 10 $(cal/cm^3)^{1/2}$, or a mixed solvent of water and that water-compatible organic solvent.

Examples of such a water-compatible organic solvent include propylene carbonate (13.3), ethylene carbonate (14.7), dimethyl carbonate (9.9), γ-butyl lactone (12.6), 1,4-dioxane (10.0), tetrahydrofuran (9.1), methanol (14.5), ethanol (12.7), ethylene glycol (14.6), and glycerin (16.5). Note that the figures in the parentheses indicate a solution parameter in $(cal/cm^3)^{1/2}$.

The solution parameter is a factor typically used to represent the polarity of a compound. For the solubility parameters above, the present invention quotes the values of the solubility parameters δ $(cal/cm^3)^{1/2}$ for solvents described at pages 527 to 539, *Polymer Handbook*, Third Edition (published by Wiley Interscience). For the solubility parameters of solvents not found therein, the present invention quotes, from *Polymer Handbook*, values calculated from substitution of Hoy's condensed energy constant described at page 525 into Small's equation described at page 524.

Preferred among those solutions are a mixed solvent of water and the water-compatible organic solvent, and especially, pure water. Water used as the solution in water solution polymerization (water solution gel polymerization) produces a liquid-absorbing resin with better liquid absorbency and less water-soluble component. Besides, the liquid-absorbing resin obtained by water solution polymerization is easier to handle, and polymerization heat is easy to remove therefrom.

Examples of methods of solution gel polymerization of the monomer component and the crosslinking agent include (a) a method for dissolving and copolymerizing the monomer component and the crosslinking agent in water and/or the water-compatible organic solvent, and (b) a method for suspending and polymerizing a water solution dissolving the monomer component and the crosslinking agent, if necessary, in a hydrophobic organic solvent in the presence of a dispersing agent.

Methods (a) and (b) include, for example, methods (i) to (iii). More specifically, employed as examples of methods (i) to (iii) are: ① a method of polymerizing a solution containing the monomer component and the crosslinking agent in the presence of a crosslinking initiator statically or with agitation; ② a method of polymerizing by irradiation of a solution containing the monomer component and the crosslinking agent with an electron beam, γ beam, etc.; and ③ a method of directly polymerizing a solution containing the monomer component and the crosslinking agent after painting the solution on a base material such as nonwoven fabric or a perforated film.

The hydrophobic organic solvent when method (b) is employed as the solution gel polymerization in the present invention is not limited in a particular manner, as long as it is an organic solvent that does not uniformly mix with water: namely cyclohexane mentioned above and cycloheptane as examples. When method (b) is employed, the polymerization reaction proceeds in the water solution. Therefore, the amount used of the hydrophobic organic solvent to the water solution dissolving the monomer component and the crosslinking agent is not limited in a particular manner, the weight ratio to the water solution above being 2 to 10 as an example. The dispersing agent is not limited in a particular manner, specifically being a surface active agent such as sorbitan monostearate, sorbitan monopalmitate, or ethyl cellulose. The amount used of the dispersing agent is not limited in a particular manner either.

Regardless of whether method (a) or (b) is adopted, the monomer component and the crosslinking agent are copolymerized and form gel in the solution above that is compatible with the resultant crosslinked polymer. The ratio of the monomer to the solution (solution that is compatible with the resultant crosslinked polymer) in the present invention is preferably in the range of 25 weight 0 to 80 weight %. If the ratio of the monomer is less than 25 weight %, it is likely that the resultant polymer is not crosslinked and dissolves in water and other substances. In addition, even if the resultant polymer is crosslinked, it becomes difficult to grind the gel polymer after polymerization. Besides, the resultant gel polymer may need a long period of time to dry, and degrade during the drying process. If the ratio of the monomer is more than 80 weight %, it is likely that the polymerization becomes difficult to control and results in a crosslinked polymer with no outstanding liquid absorbency, and that crosslinking becomes non-uniform and increases soluble component.

In the present invention, when the polymerization reaction is initiated, for example, a polymerization initiator or an active energy beam such as ultra-violet beam or electron beam can be used.

The polymerization initiator used in the polymerization reaction is not limited in a particular manner. Various conventional well-known polymerization initiators can be used, preferably being an azo initiator, more specifically being azoamidine compounds such as 2,2'-azobis(2-aminodipropane)dihydrochloride salt, 2,2'-azobis[2-(N-allylamidino)propane]dihydrochloride salt, and 2,2'-azobis{2-[N-(2-hydroxyethyl)amidino]propane}dihydrochloride salt, cycloazoamidine compounds such as 2,2'-azobis[2-(2-imidazoline-2-ile)propane]dihydrochloride salt, azoamide compounds such as 2,2'-azobis[2-methyl-N-(2-hydroxyethyl)propioneamide], 2,2'-azobisisobutylonitrile, and 2,2'-azobis(2,4-dimethylvaleronitrile as examples, and more specifically being 2,2'-azobis (2-amidinopropane) dihydrochloride salt and 2,2'-azobis(2,4-dimethylvaleronitrile) as examples. If an oxidizing radical polymerization initiator is used as the polymerization initiator, redox polymerization may be carried out by using a reducing agent together.

The amount used of the polymerization initiator varies depending upon the composition, concentration, polymerization conditions, etc. of the monomer component used, generally being in a range of 0.01 g to 5 g per one mole of the monomer component, and preferably being in a range of 0.05 g to 1 g. If the amount used of the polymerization initiator is less than 0.01 g, it is likely that the polymerization is not initiated or that the monomer component remains unpolymerized in a larger amount. If the amount used of the polymerization initiator is more than 5 g, it is likely that the polymerization becomes difficult to control and results in a crosslinked polymer with no outstanding liquid absorbency.

The polymerization temperature of the polymerization reaction is not limited in a particular manner, generally being in a range of 0° C. to 95° C., preferably being in a range of 20° C. to 80° C. If the polymerization temperature is lower than 0° C., the polymerization takes too much time and declines in efficiency to produce a crosslinked polymer, which is not desirable. If the polymerization temperature is higher than 95° C., it is likely that the polymerization becomes difficult to control and results in a crosslinked polymer with no outstanding liquid absorbency.

The polymerization time is not limited in any particular manner, being specified properly depending upon the polymerization method, polymerization temperature, the kind and amount of the monomer component, the kind and amount of the crosslinked polymer, the kind and amount of the solution, the combination thereof, etc., so as to complete the polymerization reaction. Other polymerization conditions such as pressure are not limited in any particular manner either.

The crosslinked polymer produced by the above polymerization reaction is dried either without undergoing any further process or after being subjected to predetermined cleaning, grinding and other processes if necessary. The drying method of the crosslinked polymer is not limited in any particular manner, being conventional well-known drying methods such as hot air flow drying, thin film drying using, for example, a drum drier, depressure drying, flow drying, freezing drying, etc. The drying temperature of the crosslinked polymer in this case is not limited in any particular manner.

The dried product is preferably classified with, for example, a sieve if necessary, after grinding into fine powder by subjecting to pulverization with, for example, hammer mill or jet mil and other operations.

The liquid-absorbing resins (crosslinked polymer) obtained in this manner can be used for various purposes such as hygienic goods, sanitary goods, contact lenses, cosmetics, paints, adhesive agents, water-stopping agents, soil-improving agents, etc. and in various fields such as the medical field for control of releasing of pharmaceuticals, where liquid absorbency is required.

Among those liquid-absorbing resins, the liquid-absorbing resins resulting from solution gel polymerization of the monomer component containing the cyclic N-vinyllactam and the crosslinking agent containing the allyl-group-containing compound exhibit especially good liquid absorbency with an electrolyte solution containing as high a concentration of salt as the solution measures 90 or over in the sum of the liquid absorption ratios for a 20-weight-% water solution of sodium chloride, a 20-weight-% water solution of calcium chloride, and a 20-weight-% water solution of magnesium chloride, and contain no more than 20 weight % soluble component.

Consequently, the liquid-absorbing resins resulting from solution gel polymerization of the monomer component containing the cyclic N-vinyllactam and the crosslinking agent containing the allyl-group-containing compound possess sufficient liquid absorbency for absorbing electrolyte solutions containing a large amount of salts and other substances, and thereby can absorb and stably retain electrolyte solutions containing various water-soluble substances. Besides, the liquid-absorbing resins exhibit excellent liquid retainment, and the liquid once retained by the liquid-absorbing resin does not leak under normal operating conditions. As a result, the liquid-absorbing resins resulting from solution gel polymerization of the monomer component containing the cyclic N-vinyllactam and the crosslinking agent containing the allyl-group-containing compound can be suitably applied in various fields where various electrolyte solutions need to be retained in a controlled manner.

In addition, the liquid-absorbing resins resulting from solution gel polymerization of the monomer component containing the cyclic N-vinyllactam and the crosslinking agent containing the allyl-group-containing compound contain no more than 20 weight % soluble component and exhibit excellent resistance when in contact with an aqueous liquid, being suitably applied in fields where safety is a primary concern. Although the soluble components should be contained in as small an amount as possible, 20 weight % or less is sufficient in terms of resistance, and also in terms of safety when used for hygienic goods, such as disposable diapers, sanitary goods, paints, adhesive agents, soil-improving agents, water-stopping agents for optic cable and electric cable, etc. However, when the liquid-absorbing resins are used as food preservatives, as an example, where even a higher degree of safety is required, it is possible to reduce the soluble components by properly specifying the combination, amount added, etc. of the monomer component and the allyl-group-containing compound.

Therefore, the liquid-absorbing resins resulting from solution gel polymerization of the monomer component containing the cyclic N-vinyllactam and the crosslinking agent containing the allyl-group-containing compound possess excellent liquid absorbency for solutions containing a high concentration of salt even under large dehydration pressure, and in addition contain less than 20 weight % soluble component, thereby exhibiting excellent water-stopping capability over a long period of time when used as a water-stopping material of the underwater cable. Moreover, the liquid-absorbing resins possess excellent liquid absorbency for organic solvents such as propylene carbonate and compatible organic solvents such as alcohols, where conventional attempts were not quite successful, and therefore can be suitably applied for recovery of those organic solvents, prevention of absorption of poisonous organic solvents by the human body, drug delivery system, releasing chemicals, gelling agents for aromatic agents, solid fuels, etc., and also can be suitably applied for gelling agents in electric cells, etc.

As described above, the liquid-absorbing resins resulting from polymerization of the monomer component containing the cyclic N-vinyllactam can be used as water-swelling polymers. Among those liquid-absorbing resins, the liquid-absorbing resins resulting from solution gel polymerization of the monomer component containing the cyclic N-vinyllactam and the crosslinking agent containing the allyl-group-containing compound exhibit especially good liquid absorbency and contain little soluble component, being suitably applied in fields where safety is a primary concern.

Studies conducted by the inventors have revealed that the liquid-absorbing resin resulting from polymerization of the monomer component containing the cyclic N-vinyllactam, in spite of being made up of a crosslinked water-soluble polymer, exhibits excellent liquid absorbency for various organic solvents such as organic solvents containing a high concentration of salt, and can be used as a water-swelling polymer, and in addition, can be used especially suitably for absorbing and retaining organic solvents.

Note that it is not yet known that a liquid-absorbing resin resulting from polymerization of the monomer component containing the cyclic N-vinyllactam can absorb and retain organic solvents.

That is, the gel composition in accordance with the present invention contains an organic solvent and a liquid-absorbing resin resulting from polymerization of a monomer component containing a cyclic N-vinyllactam, the liquid-absorbing resin retaining the organic solvent inside.

In the gel compound, an organic solvent can be retained by the liquid-absorbing resin, for example, either by letting the organic solvent absorbed into a liquid-absorbing resin resulting from polymerization of a monomer component containing a cyclic N-vinyllactam in the presence of a crosslinking agent or by directly producing a gel liquid-absorbing resin by solution gel polymerization of a monomer component containing a cyclic N-vinyllactam in the organic solvent in the presence of a crosslinking agent.

In the present invention, for a case of polymerizing the monomer component containing the cyclic N-vinyllactam and letting the resultant liquid-absorbing resin absorb the organic solvent, the aforementioned various polymerization methods can be used. Absorption of a desired organic solvent by the resultant liquid-absorbing resin will produce a liquid-absorbing resin retaining that organic solvent.

In the present invention, the organic solvent which can be retained by the liquid-absorbing resin is not limited in any particular manner, as long as it is compatible with the liquid-absorbing resin and gels by swelling the liquid-absorbing resin. Examples of such an organic solvent include compatible organic solvent of a solubility parameter of not less than 9 $(cal/cm^3)^{1/2}$, and preferably not less than 10 $(cal/cm^3)^{1/2}$.

In the present invention, for a case of directly producing the gel liquid-absorbing resin from the monomer component containing the cyclic N-vinyllactam, the monomer component containing the cyclic N-vinyllactam should be subjected to solution gel polymerization in an organic solvent in the presence of a crosslinking agent. By subjecting the monomer component containing the cyclic N-vinyllactam to solution gel polymerization in an organic solvent in the presence of a crosslinking agent, the polymerization can proceed with no precipitation of a crosslinked polymer formed in the polymerization reaction and an intermediate product therefor, and a gel crosslinked polymer (liquid-absorbing resin) can be obtained after polymerization.

Consequently, in the present invention, in a case of directly producing a gel liquid-absorbing resin from the monomer component to obtain a liquid-absorbing resin retaining an organic solvent, the organic solvent should dissolve the monomer component, crosslinking agent, etc., and form a uniform gel with the resultant crosslinked polymer after polymerization. Examples of such an organic solvent include compatible organic solvent of a solubility parameter not less than 9 $(cal/cm^3)^{1/2}$, and preferably not less than 10 $(cal/cm^3)^{1/2}$.

The liquid-absorbing resin obtained in this manner, if absorbing (retaining), for example, propylene carbonate or γ-butyl lactone as the organic solvent, exhibits a liquid absorbency ratio as high as 15 times or over regardless of whether or not the organic solvent contains, for example, lithium ion salt as an electrolyte. Besides, the liquid-absorbing resin possesses excellent liquid retainment, and the liquid once retained by the liquid-absorbing resin does not leak under normal operating conditions.

Therefore, if the liquid-absorbing resin is used, it becomes possible to retain an electrolyte-containing organic solvent, as an electrolyte liquid, formed by a non-protonic organic solvent, such as propylene carbonate or γ-butyl lactone, dissolving a lithium ion salt as an electrolyte, and thereby to use highly reducing lithium as the negative-pole-active substance. Therefore, if the liquid-absorbing resin is used as a gelling agent for a high polymer solid electrolyte, it becomes possible to prepare an electric cell with a high generating capability.

Therefore, the gel compositions in accordance with the present invention, including the liquid-absorbing resins retaining the organic solvent, possess excellent liquid retainment for various organic solvents, and can be suitably applied for various purposes where organic solvent needs to be absorbed and retained, such as electric cells, drug delivery system, solid fuels, releasing chemicals, gelling agents for aromatic agents, etc.

In the present invention, for a case of applying the gel composition to an electric cell, the gel composition preferably contains, as the organic solvent, an organic solvent that can dissolve an electrolyte or an organic solvent in which an electrolyte is dissolved (an electrolyte-containing organic solvent).

The solvent of the electrolyte-containing organic solvent used in the case where the gel composition in accordance with the present invention contains the electrolyte-containing organic solvent as the organic electrolyte is not limited in any particular manner, as long as it is an organic solvent that can dissolve the electrolyte, preferably being at least one organic solvent selected from the group consisting of propylene carbonate, ethylene carbonate, dimethyl carbonate, γ-butyl lactone, 1,4-dioxane, and tetrahydrofuran, especially preferably being propylene carbonate.

The electrolyte is not limited in any particular manner, as long as it is an ionic salt such as a salt of lithium ions or a salt of potassium ions, preferably being a salt of lithium ions to prepare an electric cell with a high generating capability. Examples of such an electrolyte include $LiClO_4$, $LiBF_4$, $LiAsF_6$, $LiCF_3SO_3$, $LiPF_6$, $LiI$, $LiBr$, $LiSCN$, $Li_2B_{10}Cl_{10}$, and $LiCF_3CO_2$ as examples.

The most preferred combination among those of the liquid-absorbing resins and the electrolyte-containing organic solvents, in terms of liquid absorbency and capability of the resultant electric cell, is polyN-vinyl-2-pyrolidone as the liquid-absorbing resin, propylene carbonate as the solvent of the electrolyte-containing organic solvent, and a salt of lithium ions as the electrolyte.

The mixture ratio of the liquid-absorbing resin and the organic solvent, i.e. the amount of the organic solvent absorbed by the liquid-absorbing resin in the gel composition, varies depending upon the kind of the liquid-absorbing resin used, the kind of the organic solvent used, containment or non-containment of the electrolyte, the kind and use of the electrolyte, etc., preferably being not less than 2:1, more preferably not less than 5:1, and even more preferably not less than 10:1.

The gel composition possesses excellent liquid absorbency and retainment for electrolyte-containing organic solvents, organic solvents which can dissolve an electrolyte, etc., and can be suitably used as a high polymer solid electrolyte in an electric cell. Therefore, the electric cell with the gel composition possesses excellent liquid absorbency and retainment for electrolyte-containing organic solvents, organic solvents which can dissolve an electrolyte, etc., and enables prevention of leakage of the absorbed organic solvent. Besides, the gel compound can be suitably used in various electric cells such as a primary electric cell and a secondary electric cell.

Figure 1:
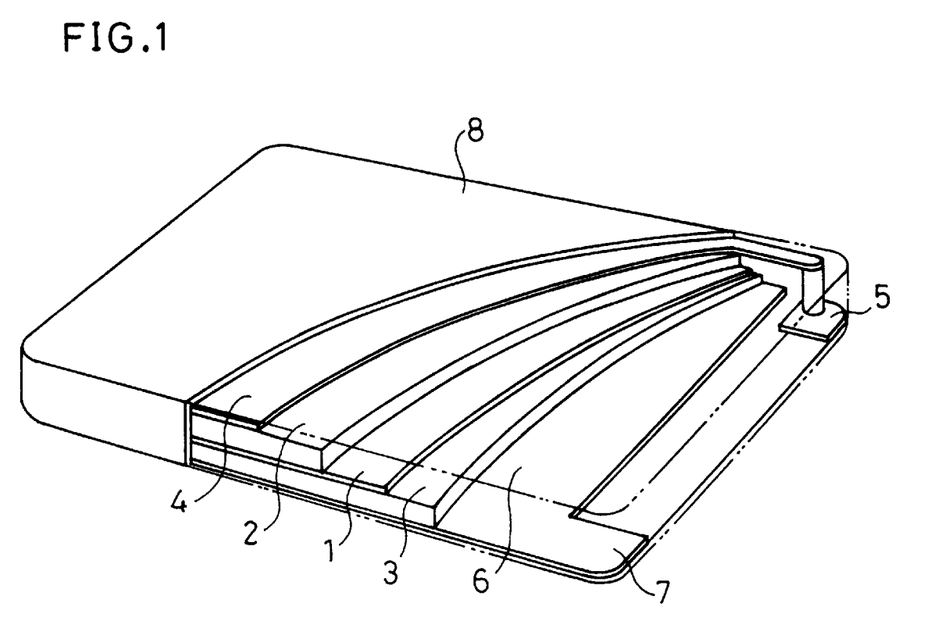
FIG. 1 is a schematic view showing an arrangement of an electric cell incorporating a gel compound of an embodiment in accordance with the present invention.

Referring to FIG. 1, the following description will discuss an electric cell incorporating the gel composition in accordance with the present invention, as an example. As shown in FIG. 1, the electric cell includes a gel composition 1, a negative pole 2, a positive pole 3, a negative lead 4, a negative terminal 5, a positive lead 6, a positive terminal 7, and a plastic seal 8 as a packaging material. In the electric cell, the negative pole 2 and the positive pole 3 are stacked so as to sandwich the gel composition 1, respectively connected to the negative terminal 5 and the positive terminal 7 by the negative lead 4 and the positive lead 6. The negative terminal 5 and the positive terminal 7 are partly exposed from the plastic seal 8 for sealing the external edge of the electric cell.

The negative-pole-active substance constituting the negative pole 2 and the positive-pole-active substance constituting the positive pole 3 may be specified depending upon the kind and use of the gel composition 1.

The negative-pole-active substance and the positive-pole-active substance are not limited in any particular manner, the negative-pole-active substance being lithium, as an example, and the positive-pole-active substance being graphite fluoride, manganese dioxide, a poly-2-vinylpyridineiodine complex as examples.

The electric cell, since using the gel composition 1 as the high polymer solid electrolyte in lieu of an electrolyte liquid, enables prevention of the liquid leakage, and therefore, requires nothing more than the sealing with a sealing material (packaging material) such as a metallic foil or high polymer film. The electric cell is thus thin and permits no liquid leakage. If a lithium electric cell is to be obtained as the electric cell, the electric cell is preferably sealed completely so that water does not filtrate into the electric cell. The electric cell does not need a metal canister and therefore can be made to fit any shape. So, the electric cell can be made in various shapes, as well as the shape shown in FIG. 1, such as a so-called coin shape, pin shape, etc. In other words, in the present invention, the arrangement of the electric cell minus the gel composition 1 is not limited in any particular manner.

As discussed above, the electric cell incorporating the gel composition in accordance with the present invention is reliable, since it possesses excellent liquid absorbency and retainment for electrolyte-containing organic solvents, organic solvents which can dissolve an electrolyte, etc., and enables prevention of leakage of these organic solvents. The electric cell can absorb electrolyte-containing organic solvents, organic solvents which can dissolve an electrolyte, etc. in large amounts, thereby potentially improving the ion conductivity and increasing capacity. The ion conductivity can be potentially improved also by the incorporation of the gel composition as the high polymer solid electrolyte the electric cell and the resultant high movability of the ions in the electrolyte. In addition, since the gel composition not only is an electrolyte layer, but also acts as a separator which is a diaphragm between the positive and negative poles, smaller space is required to separate the positive and negative poles, allowing electrolyte-containing organic solvents or organic solvents which can dissolve an electrolyte to absorb more liquid.

For a fuller understanding of the nature of the invention, reference should be made to the ensuing detailed description taken in conjunction with the accompanying drawing.

BEST MODES OF CARRYING OUT THE INVENTION

The following description will discuss the present invention further in detail by way of examples and comparative examples, which by no means limit the scope of the present invention. The liquid absorption ratio of a liquid-absorbing resin was measured in the method detailed below.

(a) Absorption Ratio

Approximately 0.2 g of a liquid-absorbing resin was precisely weighed, put into a tea bag made of nonwoven square fabric 5 cm on an edge, and sealed with heat seal. The tea bag was immersed in a test solution at room temperature, lifted out of the test solution after 24 hours, and placed in a centrifugal separator for 3 minutes to remove liquid at 1300 rpm. The tea bag was measured for weight $W_1$ (g). The same process was repeated without using a crosslinked polymer for the weight $W_0$ (g) of the tea bag as a blank. The liquid absorption ratio was calculated according to the following equation:

$$\frac{(W_1(g) - W_0(g) - \text{Weight of Water} - \text{absorbing Resin}(g))}{\text{Weight of Water} - \text{Absorbing Resin}(g)}$$

(b) Amount of Soluble Components

Approximately 0.5 g of a liquid-absorbing resin was precisely weighed, added into 1000 g of pure water, agitated for 16 hours, and filtered with filtering paper and membrane filter. The filtrate was condensed with an evaporator, dried in a weighing bottle at 105° C., and measured for weight (g) of the residue. The amount of soluble components was calculated according to the following equation:

$$\text{Amount of Soluble Components (Weight \%)} = \frac{1000(g)}{\text{Weight of Filtrate}(g)} \times \frac{\text{Weight of Residue}(g)}{\text{Weight of Water} - \text{absorbing Resin}(g)} \times 100$$

EXAMPLE 1

First, 55.5 g (0.5 mol) of N-vinyl-2-pyrolidone (MW 111.1), that is a cyclic N-vinyllactam refined by vacuum distillation, 0.0374 g of cyanuric acid triallyl (Mw 249.3) as an allyl-group-containing compound, and 129.5 g of water were mixed for a water solution of a monomer component. The amount of the cyclic N-vinyllactam contained in the monomer component was 100 mole %, the concentration of the monomer component in the water solution was 30 weight %, and the ratio of the cyanuric acid triallyl to the N-vinyl-2-pyrolidone was 0.03 mole %.

Next, nitrogen gas was blown into the water solution to drive out the dissolved oxygen, and at the same time to replace the reaction system with nitrogen gas. Subsequently, 0.125 g of 2,2'-azobis(2-amidinopropane) dihydrochloride salt was added into the water solution as a polymerization initiator, and the mixture was polymerized in a beaker of 250 ml in an atmosphere of nitrogen gas for 2 hours to produce a gel polymer.

Next, the produced gel polymer was cut into a size about 5 mm, and dried for 3 hours at 120° C. in an atmosphere of nitrogen gas. The gel polymer was not sticky and could be cut easily with scissors. Thereafter, the dried product was ground and sieved with sieves having mesh of 850 μm and 150 μm. The liquid-absorbing resin having such particle diameters to pass through the mesh of 850 Am, but not to pass through the mesh of 150 Am, was thus obtained (hereinafter referred to as liquid-absorbing resin (1)). Liquid-absorbing resin (1) was measured for soluble components therein and liquid absorption ratios for various test solutions according to the methods mentioned above. Results of the measurement are shown in Table 1.

The test solutions were, as shown top to bottom in Table 1, pure water, physiological salt solution (0.9 weight % common salt water solution), artificial urine, artificial oceanic water (product name: aquamarine S, available from Yashima Pure Chemical Co., Ltd.), a 20% water solution of sodium chloride, a 20% water solution of calcium chloride, a 20% water solution of magnesium chloride, methanol (MeOH), ethanol (EtOH), ethylene glycol (EG), and propylene carbonate.

The artificial urine is composed of 0.200 weight % sodium sulfide, 0.200 weight % kalium chloride, 0.050 weight % magnesium chloride hexahydrate, 0.025 weight % calcium chloride dihydrate, 0.035 weight % ammonium dihydrogen phosphate, 0.015 weight % diammonium hydrogen phosphate, and 99.475 weight % deionized water.

COMPARATIVE EXAMPLE 1

Polyacrylic acid liquid-absorbing resin (product name: aquatic CA, available from Nippon Shokubai Co., Ltd. and hereinafter referred to as comparative liquid-absorbing resin (1)), that is a conventional liquid-absorbing resin, was measured for soluble components therein and liquid absorption ratios for various test solutions according to the same methods as in Example 1. Comparative liquid-absorbing resin (1) was sieved with sieves in the same manner as in Example 1 to have the same particle diameters with liquid-absorbing resin (1). Results of the measurement are shown in Table 1.

COMPARATIVE EXAMPLE 2

N-vinyl acetamide liquid-absorbing resin (product name: NA-010, available from Showa Denko KK and hereinafter referred to as comparative liquid-absorbing resin (2)), as a liquid-absorbing resin corresponding to the description in Japanese Laid-Open Patent Application No. 4-230250/1992 (Tokukaihei 4-230250), was measured for soluble components therein and liquid absorption ratios for various test solutions according to the same methods as in Example 1. Comparative liquid-absorbing resin (2) was sieved with sieves in the same manner as in Example 1 to have the same particle diameters with liquid-absorbing resin (1). Results of the measurement are shown in Table 1.

TABLE 1

| | Example 1 | Comparative Example 1 | Comparative Example 2 |
|---|---|---|---|
| Soluble Components (weight %) | 15.0 | 25.2 | 5.5 |
| Liquid Absorption Ratios of Liquid Absorbing Resins | | | |
| Pure Water (g/g) | 27.9 | 280.0 | 24.6 |
| Physiological Salt Solution (g/g) | 29.3 | 29.3 | 26.7 |
| Artificial Urine (g/g) | 30.2 | 42.0 | 24.7 |
| Artificial Oceanic Water (g/g) | 31.3 | 2.8 | 26.1 |
| 20% NaCl (g/g) | 30.6 | 8.9 | 25.5 |
| 20% CaCl$_2$ (g/g) | 38.7 | 0.9 | 29.8 |
| 20% MgCl$_2$ (g/g) | 34.9 | 2.7 | 33.6 |
| MeOH (g/g) | 23.2 | — | 22.2 |
| EtOH (g/g) | 20.6 | — | 17.1 |
| EG (g/g) | 25.0 | — | 25.6 |
| Propylene Carbonate (g/g) | 16.1 | — | 1.4 |

EXAMPLE 2

The same reactions and operations as in Example 1 were conducted, except a change in the amount added of cyanuric acid triallyl from 0.0374 g to 0.0623 g, to obtain a liquid-absorbing resin (hereinafter referred to as liquid-absorbing resin (2)). The ratio of the cyanuric acid triallyl to the N-vinyl-2-pyrolidone was 0.05 mole %. Liquid-absorbing resin (2) was measured for soluble components therein and liquid absorption ratios for pure water and physiological salt solution according to the same methods as in Example 1. Results of the measurement are shown in Table 2.

EXAMPLE 3

The same reactions and operations as in Example 1 were conducted, except using 0.0635 g of tetraallyloxyethane as an allyl crosslinking agent in lieu of cyanuric acid triallyl, to obtain a liquid-absorbing resin (hereinafter referred to as liquid-absorbing resin (3)). The ratio of the tetraallyloxyethane to the N-vinyl-2-pyrolidone was 0.05 mole %. Liquid-absorbing resin (3) was measured for soluble components therein and liquid absorption ratios for pure water and physiological salt solution according to the same methods as in Example 1. Results of the measurement are shown in Table 2.

TABLE 2

| Soluble Components (weight %) | | Example 2<br>7.6 | Example 3<br>13.5 |
|---|---|---|---|
| Liquid-Absorbing Ratios of Liquid-Absorbing Resin | Pure Water (g/g)<br>Physiological Salt Solution (g/g) | 23.9<br>24.2 | 27.0<br>28.7 |

As clearly understood from Table 1, liquid-absorbing resin (1) is inferior to comparative liquid-absorbing resin (1) in liquid absorbency only when the test solution is pure water or artificial urine, but, is extremely superior in liquid absorbency when the test solution is of other kinds, especially the highly concentrated salt solutions, alcohols, ethylene glycol used for antifreeze liquid, and the organic solvents such as propylene carbonate. Therefore, liquid-absorbing resin (1) can be suitably applied for recovery of the test solutions through absorption, prevention of absorption of poisonous organic solvents by the human body, drug delivery system, releasing chemicals, gelling agents for aromatic agents, solid fuels, etc.

Comparative liquid-absorbing resin (2), although containing little soluble component, lacks sufficient liquid absorbency, especially, for the highly concentrated salt solutions and the organic solvents such as propylene carbonate. Liquid-absorbing resin (1) obtained in the present example measures 2 (g/g) in the liquid absorption ratio for propylene carbonate and 90 (g/g) or over in the sum of the liquid absorption ratios for the 20-weight-% water solution of sodium chloride, the 20-weight-% water solution of calcium chloride, and the 20-weight-% water solution of magnesium chloride, being superior to comparative liquid-absorbing resin (2) in liquid absorbency for all the test solutions. Therefore, it is understood that liquid-absorbing resin (1) is more suitably applied to the various test solutions than the conventional counterparts.

Moreover, liquid-absorbing resin (1) possesses superior liquid retainment to comparative liquid-absorbing resins (1) and (2) even under large dehydration pressure, for example, when placed in a centrifugal separator at 1300 rpm for 3 minutes to remove liquid as in the measurement for liquid absorption ratios in the present example, and the liquid once retained by liquid-absorbing resin (1) does not leak under normal operating conditions. For these reasons, the liquid-absorbing resins in accordance with the present invention is free from problems caused by leakage of liquid that has been once retained.

As clearly understood from Table 2, it is possible to further reduce the soluble components of the obtained liquid-absorbing resin through the kind and amount added of the allyl-group-containing compound.

EXAMPLE 4

First, 100 parts of N-vinyl-2-pyrolidone (MW 111.1) that is a cyclic N-vinyllactam refined by vacuum distillation, 0.69 parts of N,N'-methylene bisacrylamide (MW 154.2) as a crosslinking agent, and 233 parts of water were mixed for a water solution of a monomer component. The amount of the cyclic N-vinyllactam contained in the monomer component was 100 mole %, the concentration of the monomer component in the water solution was 30 weight %, and the amount of the crosslinking agent contained was 0.5 mole %.

Next, nitrogen gas was blown into the water solution to drive out the dissolved oxygen, and at the same time to replace the reaction system with nitrogen gas. Subsequently, 0.23 parts of 2,2'-azobis(2-amidinopropane) dihydrochloride salt was added into the water solution as a polymerization initiator, and the mixture was reacted in water bath of 50° C. for 2 hours. A transparent gel polymer was obtained 2 hours later.

Thereafter, the produced gel polymer was cut into fine pieces, and dried for 3 hours at 80° C. A white resin was obtained after the drying process. The obtained resin was ground and sieved with sieves having mesh of 850 $\mu$m and 150 $\mu$m. The crosslinked polymer, as a liquid-absorbing resin, having such particle diameters to pass through the mesh of 850 $\mu$m, but not to pass through the mesh of 150 $\mu$m, was thus obtained.

The crosslinked polymer was measured for liquid absorption ratios for the various organic solvents according to the methods mentioned above. Results of the measurement are shown in Table 3.

TABLE 3

| Organic Solvents, Electrolyte-Containing Organic Solvents | Liquid Absorption Ratios of Crosslinked Polymer (g/g) |
|---|---|
| Propylene Carbonate | 17.4 |
| Propylene Carbonate Containing 10 weight % Lithium Perchlorate | 15.7 |
| Propylene Carbonate Containing 10 weight % Trifluoromethane Lithium Sulfate | 23.6 |
| γ-Butyl Lactone | 15.2 |
| γ-Butyl Lactone Containing 10 weight % Lithium Perchlorate | 18.4 |
| 1,4-Dioxane | 7.6 |

As clearly understood from Table 3, the crosslinked polyvinylpyrolidone, that is the crosslinked polymer obtained in the example above, possesses high liquid absorption for the electrolyte-containing organic solvents or the organic solvents which can dissolve an electrolyte. Therefore, the gel compounds resulting from absorption of the organic solvent by the crosslinked polymer can retain the organic solvent in a gel state, being suitably used as a solid electrolyte in an electric cell and for other purposes.

Moreover, the crosslinked polyvinylpyrolidone possesses excellent liquid retainment even under large dehydration pressure when placed in a centrifugal separator at 1300 rpm for 3 minutes, and the liquid once retained by that crosslinked polyvinylpyrolidone does not leak under normal operating conditions. For these reasons, the gel compound in accordance with the present invention is free from problems caused by leakage of liquid that has been once retained.

Therefore, by incorporating the gel composition as the solid electrolyte in an electric cell, the electric cell becomes more reliable, since it possesses excellent liquid absorbency and retainment for electrolyte-containing organic solvents, organic solvents which can dissolve an electrolyte, etc., and enables prevention of leakage of these organic solvents.

It should be understood that the detailed embodiments and specific examples discussed under the title of BEST MODES OF CARRYING OUT THE INVENTION has a sole purpose of illustrating the present invention in terms of the technologies involved, and should not be interpreted in a manner confined only to those embodiments and specific examples, since various changes and modifications are possible within the spirit and scope of the invention and the claims below.

INDUSTRIAL APPLICABILITY

The liquid-absorbing resins in accordance with the present invention possesses superb liquid absorbency for electrolyte solutions containing a high concentration of salt, and contains little soluble component. Therefore, the liquid-absorbing resins can absorb and stably retain electrolyte solutions containing various water-soluble substances. For these reasons, the liquid-absorbing resins can be suitably applied in various fields where various electrolyte solutions need to be retained in a controlled manner. In addition, the liquid-absorbing resins contain little soluble component, exhibit excellent resistance, and can be suitably applied in fields where safety is a primary concern. The liquid-absorbing resins can be suitably used for hygienic goods, sanitary goods, contact lenses, cosmetics, paints, adhesive agents, water-stopping agents, soil-improving agents, medical purposes for control of releasing of pharmaceuticals, water-stopping agents for optic cable, electric cable and submarine cable, recovery of organic solvents and other substances, prevention of absorption of poisonous organic solvents by the human body, drug delivery system, gelling agents for aromatic agents, solid fuels, high polymer solid electrolytes for batteries, etc. The gel compounds in accordance with the present invention can be suitably used where organic solvents containing an electrolyte needs to be retained, such as in an electric cell, since the liquid-absorbing resin produced by polymerization of the monomer component containing the cyclic N-vinyllactam possesses excellent liquid absorbency and retainment for organic solvents, especially, organic solvents containing an electrolyte.

What is claimed is:

1. A liquid-absorbing resin composition comprising: a liquid-absorbing resin including a monomer component containing a cyclic N-vinyllactam, and wherein the liquid-absorbing resin measures not less than 90 in the sum of the liquid absorption ratios thereof for a 20-weight-% water solution of sodium chloride, a 20-weight-% water solution of calcium chloride, and a 20-weight-% water solution of magnesium chloride, and contains not more than 20 weight % soluble component.

2. A gel composition comprising:

a liquid-absorbing resin including a polymerized monomer component containing a cross-linked cyclic N-vinyllactam; and an organic solvent retained in the liquid-absorbing resin, and the solvent is selected from a group consisting of propylene carbonate, ethylene carbonate, dimethyl carbonate, $\gamma$-butyl lactone, 1,4-dioxane, and tetrahydrofuran, wherein the organic solvent has an ability to dissolve an electrolyte.

3. The gel compound as set forth in claim 2, being characterized in that the cyclic N-vinyllactam is contained in the monomer component in an amount of not less than 50 mole %.

4. The gel compound as set forth in claim 2, wherein the cyclic N-vinyllactam is N-vinyl-2-pyrolidone.

5. The gel compound as set forth in claim 2, being characterized in that the organic solvent contains an electrolyte.

6. An electric cell, comprising the gel composition as set forth in claim 2 as a high polymer solid electrolyte.

7. A gel composition comprising:

a liquid-absorbing resin formed of a crosslinked polymer of N-vinyl-2-pyrolidone;

an organic solvent retained in the liquid-absorbing resin and the crosslinked polymer of N-vinyl-2-pyrolidone retains therein propylene carbonate containing a salt of lithium ions.

8. A method of manufacturing a liquid-absorbing resin comprising the step of:

(a) copolymerizing a monomer component containing a cyclic N-vinyllactam with a crosslinking monomer containing an allyl-group-containing compound in a water solution and in the presence of a polymerization initiator, wherein the liquid-absorbing resin measures 90 or more in the sum of liquid absorption ratios thereof for a 20-weight-% water solution of sodium chloride, a 20-weight-% water solution of calcium chloride, and a 20-weight-% water solution of magnesium chloride, and contains no more than 20 weight % soluble component.

9. A gel composition comprising:

a liquid-absorbing resin including a crosslinked polymer of cyclic N-vinyl-2-pyrolidone;

an organic solvent retained in the liquid-absorbing resin, and a propylene carbonate containing a salt of lithium ions retained in the liquid-absorbing resin.

10. A gel composition comprising:

a liquid-absorbing resin including crosslinked polymer of cyclic N-vinyllactam;

an organic solvent retained in the liquid-absorbing resin, and a propylene carbonate containing a salt of lithium ions retained in the liquid-absorbing resin.

* * * * *